R. SARLLS & A. KELMAN.
Combined Planter, Cultivator and Cotton-Chopper.
No. 204,765. Patented June 11, 1878.
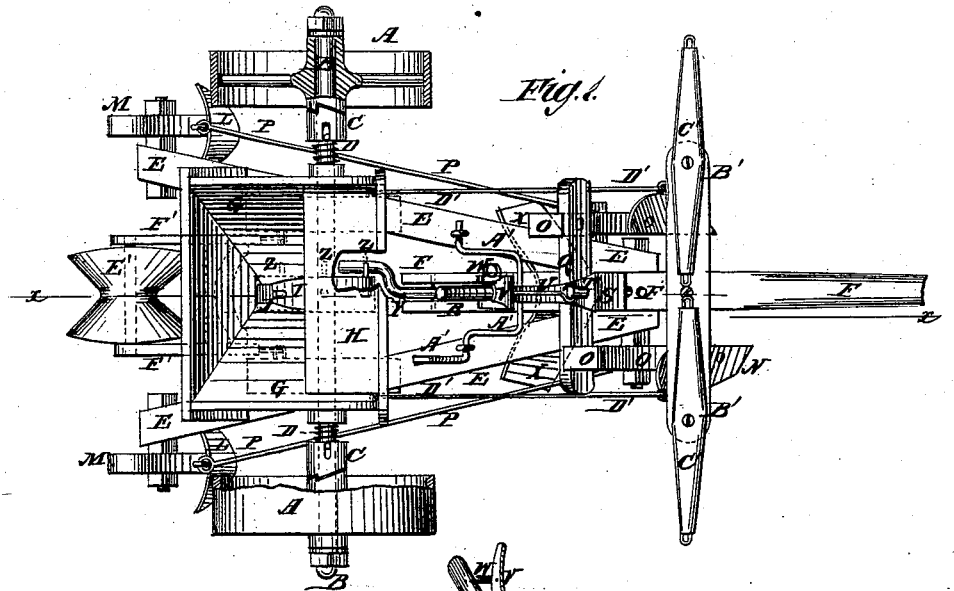
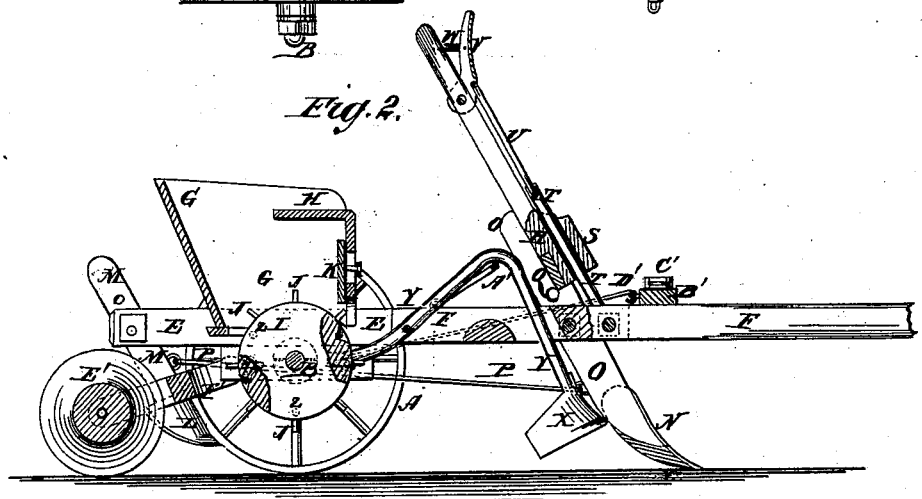
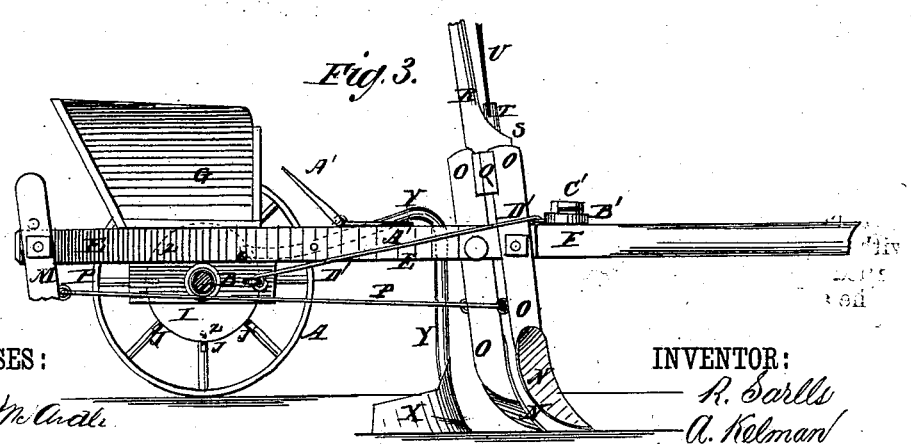
WITNESSES:
Francis McArdle
C. Sedgwick
INVENTOR:
R. Sarlls
A. Kelman
BY
ATTORNEYS.

UNITED STATES PATENT OFFICE.

RUTUS SARLLS AND ALEXANDER KELMAN, OF NAVASOTA, TEXAS; SAID SARLLS ASSIGNOR TO ALEXANDER KELMAN.

IMPROVEMENT IN COMBINED PLANTER, CULTIVATOR, AND COTTON-CHOPPER.

Specification forming part of Letters Patent No. 204,765, dated June 11, 1878; application filed March 27, 1878.

*To all whom it may concern:*

Be it known that we, RUTUS SARLLS and ALEXANDER KELMAN, of Navasota, in the county of Grimes and State of Texas, have invented a new and useful Improvement in Combined Seed-Planter, Cultivator, and Cotton-Chopper, of which the following is a specification:

Figure 1 is a top view of the machine, parts being broken away to show the construction. Fig. 2 is a vertical longitudinal section of the same, taken through the line $x\ x$, Fig. 1. Fig. 3 is a side view of the same, one of the wheels being removed.

The object of this invention is to furnish an improved machine which shall be so constructed that it may be readily adjusted for use in planting seed, cultivating plants, and chopping cotton to a stand, and which shall be simple in construction, convenient in use, and effective and reliable in operation in either capacity.

The invention consists in the dropping-wheel, provided with cavities to drop smooth seeds, with face-pins to drop cotton-seeds, and with side pins to operate the chopper.

Similar letters of reference indicate corresponding parts.

A are the wheels, which are placed upon the journals of the axle B, and are made to carry the said axle with them in their revolution by the clutches C, placed upon the said axle B, and held out against the hubs of the said wheels by springs D. The teeth of the clutches C and the hubs of the wheels A are so formed that the said wheels will carry the said axle with them when turned forward, but not when turned backward.

The axle B revolves in bearings attached to the bars E, which form the frame of the machine, and which are placed with their forward ends inclined toward each other. The inner sides of the forward ends of the bars E are beveled off, and to and between them is bolted the rear end of the tongue F. G is the seed-hopper, which is attached to the bars E directly over the axle B, and to the top of its forward part is attached a board, H, to serve as a seat for the driver. To the axle B, directly beneath the hopper G, is attached a wheel, I, so that its face may form the bottom of the said hopper. In the face of the wheel I are formed a number of cavities or cups, to receive the seed and drop it to the ground when planting corn and other smooth seed.

To the face of the wheel I are detachably attached radial pins J, to take hold of cotton-seeds and draw them out through a slot in the lower part of the forward side of the hopper. The amount of cotton-seed planted depends upon the number of pins J used and the size of the discharge-opening in the front of the hopper. The size of the discharge-opening is regulated by an adjustable slide, K, secured adjustably to the forward side of the hopper.

L are the rear plows, which are attached to the lower ends of the standards M. The standards M are bolted to the sides of the rear ends of the bars E, and are brought to the proper distance apart by means of blocks interposed between them and the said bars.

N are the forward plows, which are attached to the lower ends of the standards O. The standards O are bolted to the forward ends of the bars E, and their distance apart is regulated by blocks interposed between them and the said bars E.

Several holes are formed in the standards M O, to receive the bolts and enable the said standards to be raised and lowered to cause the plows to work shallower or deeper in the ground, as may be desired. The standards M O upon each side are connected by a rod, P, so that the rear standards M may be raised and lowered by raising and lowering the forward standards O. The forward standards O are arranged the one a little in advance of the other, and their upper ends are attached the one to the forward side and the other to the rear side of the opposite ends of the cross-bar Q. To the middle part of the cross-bar Q is rigidly attached a lever, R, which projects into such a position that it may be readily reached and operated by the driver from his seat H.

To the lower end of the lever R is attached a guide or keeper, S, to receive the pin T, the lower end of which enters a hole in the rear part of the tongue F to lock the plow-standards in place when in a working position. To the upper end of the pin T is pivoted the lower end of a rod, U, the upper end of which is pivoted to a short lever, V. The lever U is pivoted at its lower end to the lever R, and its upper end is held out by a spring, W, attached to it and to the side lever R.

X is the chopping-plow, which is attached to the lower end of the standard Y. The standard Y passes up through a slot in the rear part of the tongue F, is bent to the rearward, and is pivoted to said tongue at its rear end. The rear end of the standards Y projects along the side of the wheel I, so as to be struck by the pins Z, attached to the side of the said wheel I. By this construction, as each pin Z strikes the rear end of the standard Y it raises the plow X from the ground to leave a hill of plants, and as each pin Z slides off the end of the said standard Y the said plow X drops to the ground to chop off the plants between the hills.

A' is a crank-lever pivoted to the side bars E E, with its crank beneath the bend of the standard Y. One end of the lever A' projects rearward and upward, as shown in Figs. 1 and 3, so that the driver may operate it with his foot to raise the chopper $x\,y$ from the ground when, on account of a "skip" or the fewness of plants, it may not be desirable to have the said chopper operate. The lever A' also sustains the draft-strain upon the standard Y.

To the tongue F, in front of the standards O, is pivoted the double-tree B', to the ends of which are pivoted whiffletrees C' in the usual way. To the rear sides of the ends of the double-tree B' are pivoted the forward ends of the rods or chains D', the rear ends of which are attached to the bars E, or to the bearings in which the axle B revolves.

The seed is covered by a roller, E', the face of which is deeply concaved or grooved, as shown in Figs. 1 and 2, to round up the top of the ridge. The roller E' is journaled in a frame, F', which is hinged, by hooks and staples or other convenient means, to the rear parts of the bars E or to the bearings of the axle B.

In using the machine for planting cotton, the forward plows N O are arranged with their mold-boards inward to throw up the middle part of the bed, the chopping-plow X is replaced with an opening-plow, the pins Z are detached, the seed is drawn out by the pins J of the wheel I, and is covered by the roller E', and the bed is finished by the rear plows L; or the middle part of the bed may be formed and seed planted at one operation, and the bed finished afterward; or the bed may be formed at one operation and the seed planted afterward, as may be desired.

In planting corn, the pins J are taken out, the slide K is lowered to close the opening in the forward side of the hopper G, and the seed is dropped by the cups or cavities of the wheel I.

In cultivating cotton, the forward plows N O are arranged with the mold-boards outward to bar off the row, the plants are chopped to a stand by the chopper $x\,y$, and the soil is thrown back around the plants by the rear plows L M.

By detaching the chopper $x\,y$ the machine may be used for cultivating corn and other plants planted in hills or drills.

Having thus fully described our invention, we claim as new and desire to secure by Letters Patent—

The dropping-wheel I, provided with cavities to drop smooth seeds, with pins J to drop cotton-seeds, and with pins Z to operate the chopper $x\,y$, substantially as herein shown and described.

RUTUS SARLLS.
ALEXANDER KELMAN.

Witnesses:
  H. SCHUMACHER,
  ROBERT HORLOCK.